Oct. 17, 1950     J. PILCH     2,526,500
TRACTOR ATTACHMENT FOR LOADERS AND THE LIKE

Filed June 3, 1947     4 Sheets-Sheet 1

INVENTOR.
JOHN PILCH.
BY
ATTORNEY.

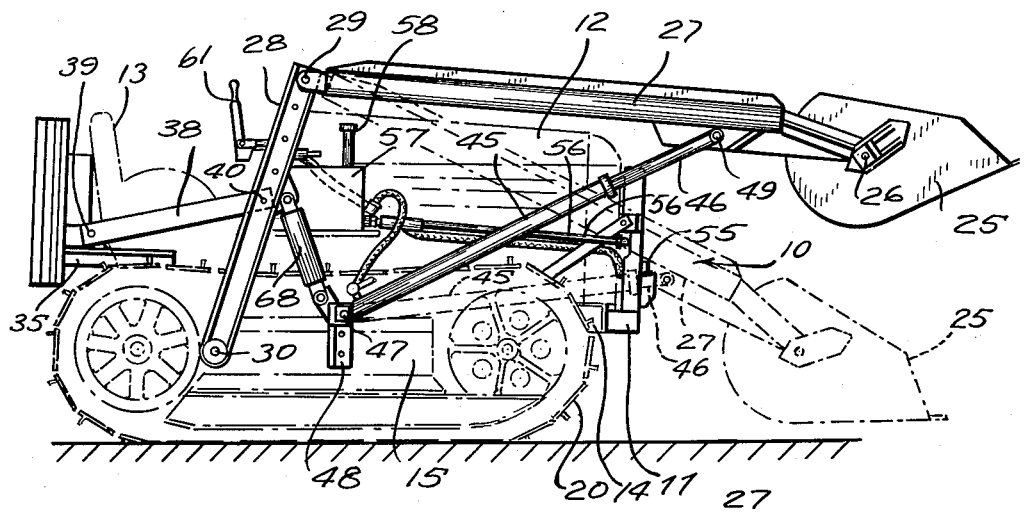
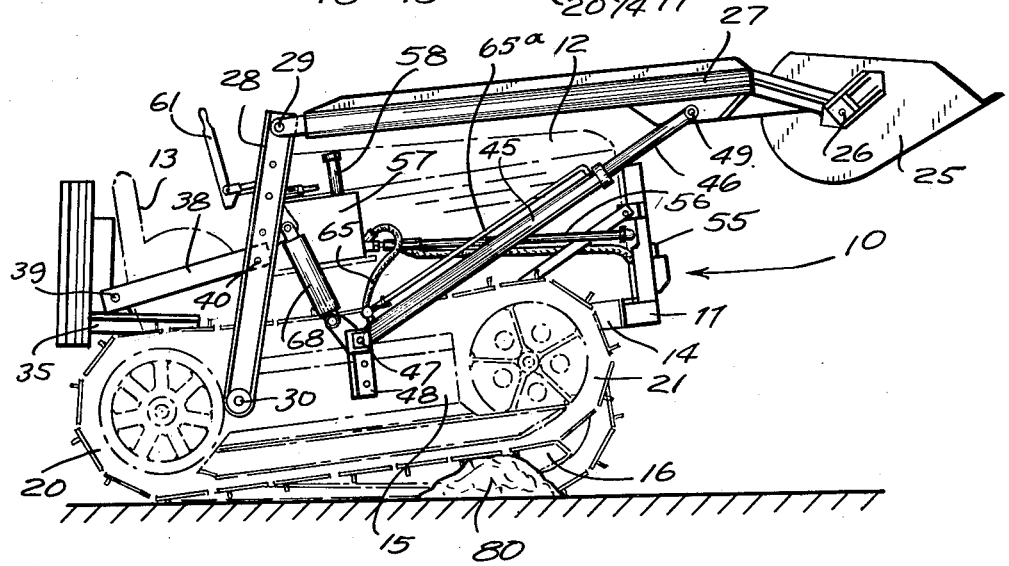

Oct. 17, 1950   J. PILCH   2,526,500
TRACTOR ATTACHMENT FOR LOADERS AND THE LIKE
Filed June 3, 1947   4 Sheets-Sheet 3
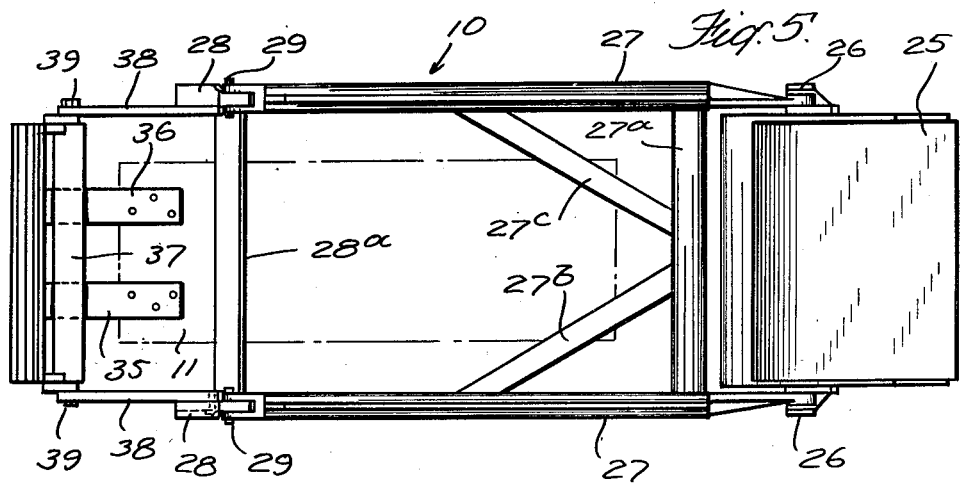
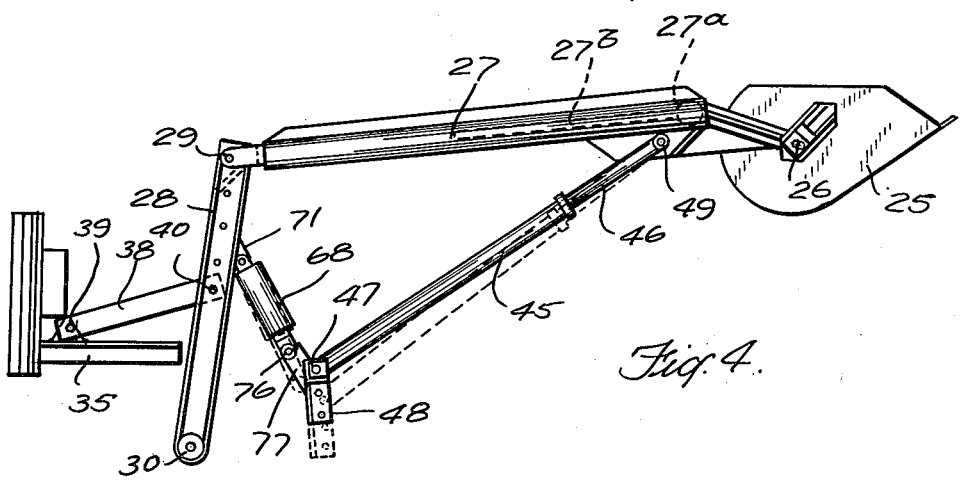
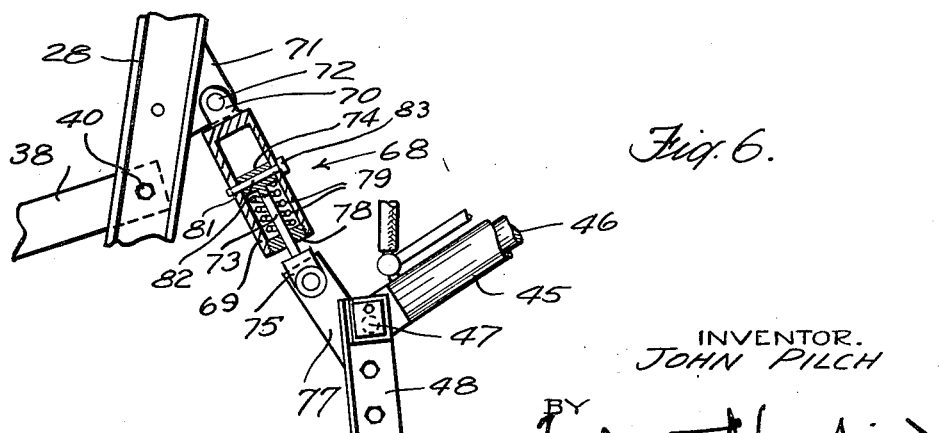
INVENTOR.
JOHN PILCH
ATTORNEY

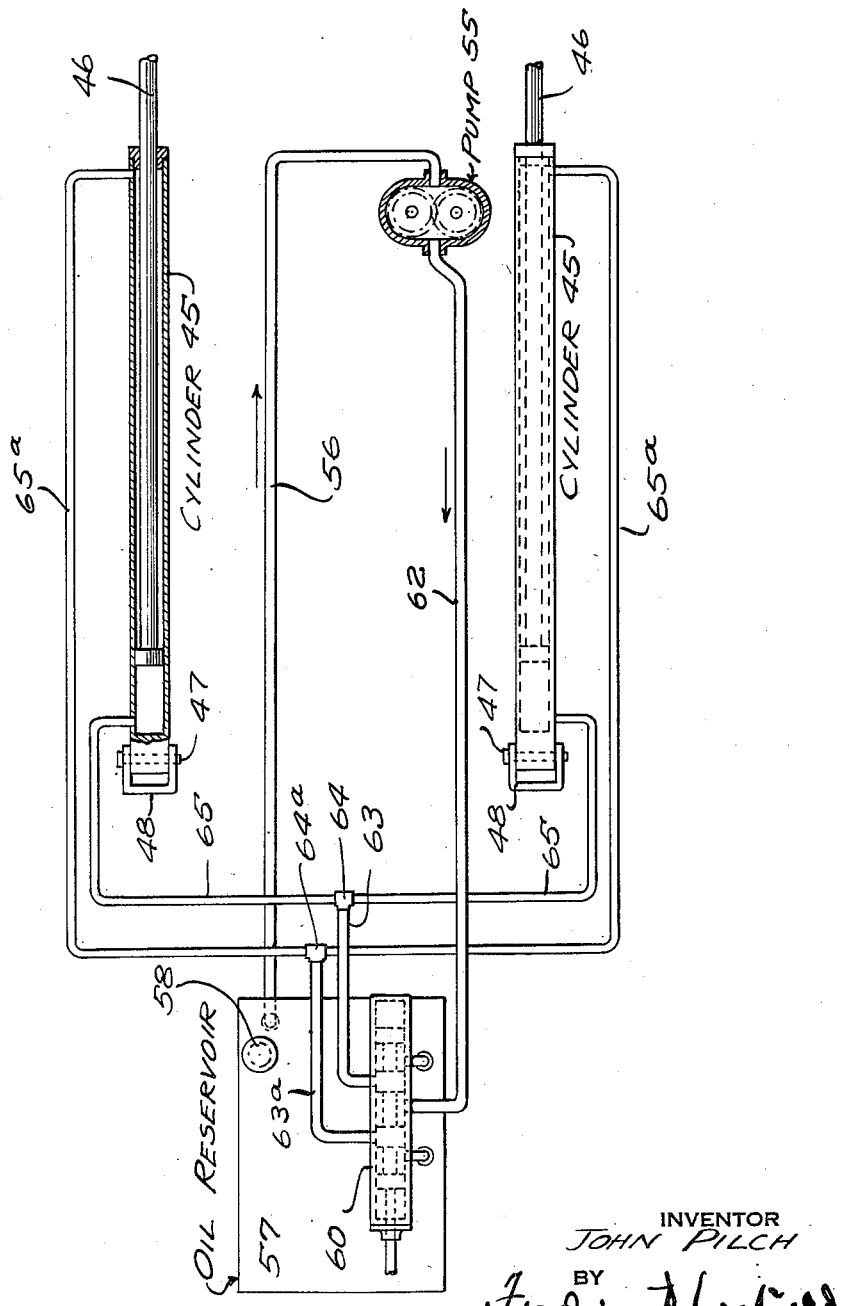

Patented Oct. 17, 1950

2,526,500

UNITED STATES PATENT OFFICE 2,526,500

TRACTOR ATTACHMENT FOR LOADERS AND THE LIKE

John Pilch, Ware, Mass.

Application June 3, 1947, Serial No. 752,162

14 Claims. (Cl. 214—140)

1

This invention relates to loading devices for tractors.

One of the objects of the invention is to provide a loader attachment for a tractor by means of which the supporting and controlling apparatus for the scoop or shovel will not be distorted by unequal resistance of the material being scooped up or unequal distribution of the weight of the material in the scoop.

Another object of the invention is to provide a loader attachment for a caterpillar tractor with equalizing devices which will maintain the scoop or shovel of the loader on an even keel when the treads of the tractor are passing over uneven ground.

Another object of the invention is to provide a loader attachment for a tractor which will be protected against abnormal shocks from blows against the scoop or shovel which might otherwise tend to damage the manipulating apparatus.

Another object of the invention is to provide a loader of the tractor type which is sturdily though simply constructed, with few moving parts, and is easy to operate with little chance of getting out of order.

Other objects of the invention will be apparent as the description thereof proceeds.

The invention is illustrated in the accompanying drawings in which:

Fig. 2 is a side elevational view of the loader and tractor showing the treads of the tractor on level ground;

Fig. 3 is a side elevational view of the loader and tractor showing the near caterpillar tread passing over a rock or other projection on the surface of the ground;

Fig. 4 is a side elevational view of the supporting mechanism of the loader (without the tractor), showing the relation between the members of opposite sides of the mechanism;

Fig. 5 is a plan view of the mechanism of Fig. 4 showing its relation to the tractor body;

Fig. 6 is an enlarged elevational view, partly in section, of a portion of the mechanism shown in Fig. 4; and Fig. 7 is an enlarged diagrammatic plan view with certain parts in section of the hydraulic control system for operating the cylinders.

Figure 1:
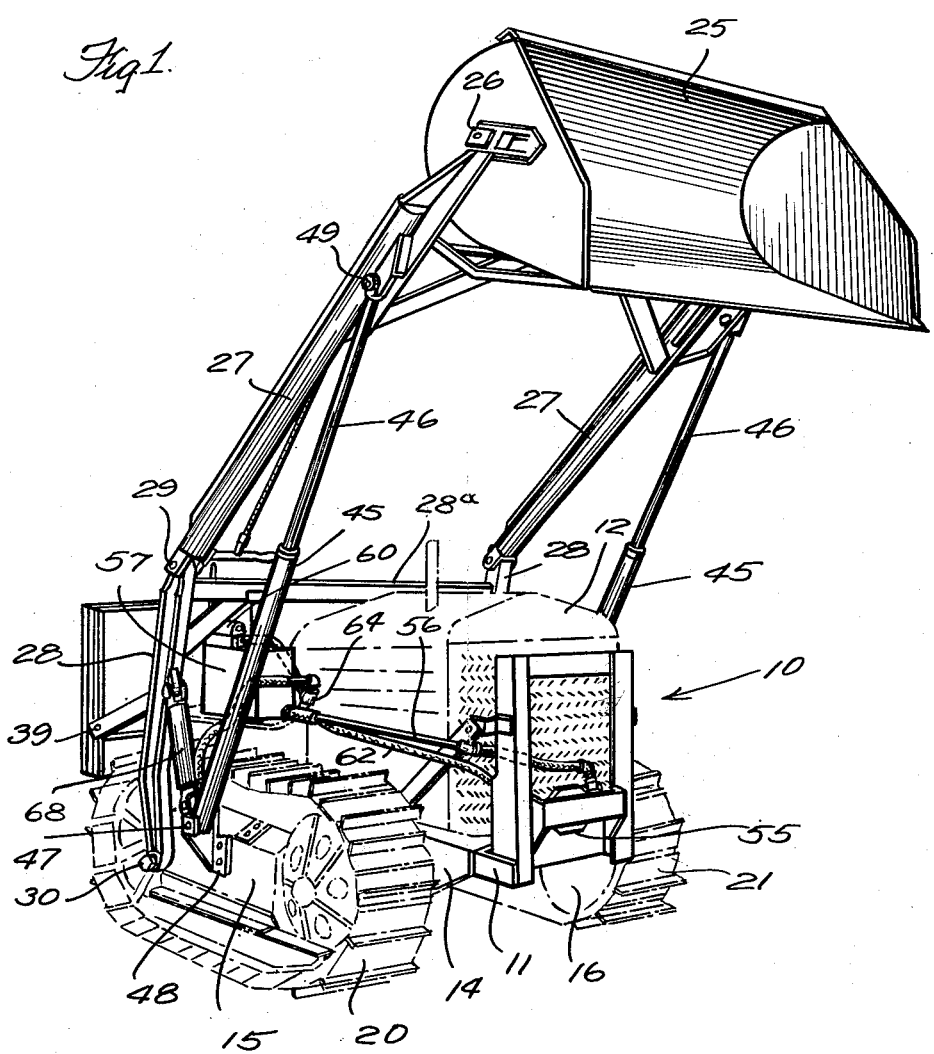
Fig. 1 is a perspective view of the loader mechanism of the invention shown applied to a caterpillar tractor and looking from the front of the tractor.

In Figs. 1, 2, 3, and 5 the loader mechanism of the invention is shown applied to a tractor 10 of the caterpillar type which is shown in dot-and-dash lines in the several figures. The tractor is provided with the usual frame or chassis 11 which carries the engine 12 at the forward end thereof and the seat 13 at the rear for the operator. The frame 11 is supported by means of brackets 14

2 on the tread carriages 15 and 16 on the right and left sides, respectively, of the tractor and upon which are mounted the caterpillar treads 20 and 21. The carriages 15 and 16 are attached to the frame in the usual manner (not shown), so as to permit up and down movement of the treads with respect to each other as the treads move over unequal projections on the surface of the ground.

The loader mechanism comprises a scoop or shovel 25 which is pivotally mounted on pins 26 secured to two pusher rods 27, one at each side of the tractor. The pusher rods extend rearwardly of the tractor to a point just forward of the seat 13 and are pivotally attached to two upright channel members 28 by pins 29. The channel members 28 are in turn pivotally supported on the carriages 15 and 16 by pins 30 which are secured to the carriages at points near the rear thereof. The pusher rods 27 are preferably arranged to move in unison and for this purpose may have cross braces 27a, 27b, and 27c connecting them rigidly together at their forward ends, the braces being welded or otherwise secured to the pusher rods.

The channel members 28 are also arranged to move in unison and for this purpose a beam 28a is provided extending between the channel members with one end rigidly attached to each, as by welding.

The channel members are held in their general upright position by pivotally linking them to the tractor frame. To this end the frame 11 is provided with two rearwardly extending arms 35 and 36 attached to the frame beneath the seat 13. These arms are connected at their rear end by a cross beam 37 the ends of which extend beyond the arms 35 and 36, the beam being just a little shorter than the distance between the two channel members 28. The arms 35 and 36 may be welded or otherwise rigidly secured to the cross beam 37. Links 38 connect the ends of the beam 37 with the channel members 28, one end of each link being pivotally attached to the associated end of the beam by a pivot pin 39 and the other end being pivotally attached to the associated channel member by a bolt 40 which is located at about the midpoint from end to end of the channel member.

With the above construction the channel members are normally held in the position shown in Figs. 1 and 2, but if the channel members were to be swung towards the rear about the pivot pins 30, they could only be so moved by the rear of the tractor frame moving downwardly with the result that the forward or engine end moves upwardly. It will be explained later how such a rearward motion of the channel members is produced resulting in the tilting action of the engine frame.

The forward ends of the pusher rods 27 are supported by hydraulic cylinders 45 and associated pistons 46. The cylinders are pivotally attached at their closed ends by means of pins 47 to brackets 48, one attached to the carriage 15 and the other attached to the carriage 16. The pistons 46 protrude from the open ends of the cylinders and are pivotally attached to the forward ends of the pusher rods 27 by pins 49, one piston being attached to the pusher rod on one side of the tractor and the other piston being attached to the pusher rod on the other side.

The open ends of the cylinders are of course provided with suitable packing to provide a fluid-tight connection to permit the pistons to move in and out of the cylinders without any leakage.

If the pistons are simultaneously pushed out of their associated cylinders, it will be seen that the pusher rods 27, together with the scoop 25 which they support, will be raised, and, conversely, if the pistons are permitted to move or are forced into their respective cylinders, the pusher rods and scoop will be lowered.

In order to force the pistons out of their respective cylinders hydraulic pressure is used. A pressure pump 55 is provided at the forward end of the tractor body, operatively connected to the tractor engine, and a pipe 56 leads from a reservoir 57 to the pump. A suitable fluid, such as oil, is used in the hydraulic system of the loader, and a supply of this material is kept in the reservoir, a filling pipe 58 being provided into which the fluid is poured to fill the reservoir.

Associated with the reservoir is a control valve 60 which may be of the usual type and is provided with a manually operable lever 61. The control valve is connected by means of the pipe 62 to the pressure side of the pump 55 and from the control valve a pipe 63 leads to a T connection 64 from which two flexible hose connections 65 lead to the two cylinders 45.

The arrangement of the control valve 60 is such that when the lever 61 is thrown in one direction (preferably towards the operator), fluid under pressure is delivered through the pipe 62, the control valve, the pipe 63, and the two flexible hose connections 65, to the cylinders. When the lever is thrown in the other direction, fluid from the pump is delivered to the reservoir, while fluid in the cylinders is permitted to return through the flexible hose connections and the pipe 63 to the reservoir. If the lever is positioned midway between the extreme positions the fluid will be prevented from returning from the cylinders, thus holding the fluid in the cylinders and therefore the pistons in whatever position they are in when the lever is placed in that position, while at the same time permitting fluid to flow from the pump to the reservoir.

In some instances I may want to apply power for lowering the scoop, as, for instance, for the purpose of digging a hole with the scoop. For this purpose the control valve 60 is made double acting and another fluid pressure pipe 63a is connected to it which has a T connection 64a from which two flexible hose connections 65a lead to the ends of the cylinders 45 adjacent the open ends thereof. Fluid delivered under pressure through these hose connections will force the pistons into the cylinder.

When the control lever is pushed away from the operator fluid is not only permitted to flow back into the reservoir 57, but at the same time fluid is delivered under pressure through the pipe 63a and flexible connections 65a to force the pistons into the cylinders, conversely, when the lever 61 is pulled towards the operator, fluid is permitted to flow back to the reservoir through the connections 65a while it is being delivered at the other ends of the cylinders through the connections 65.

This operation of the hydraulic system is conventional and forms no part of the present invention; hence the details of the pump, control valve, and connections therebetween need not be explained in detail.

A particular feature of the invention is an equalizer 68 one of which is connected on each side between the channel members 28 and a point on the tread carriage adjacent the pivot 47. The equalizer 68, (see Fig. 6), comprises a cylinder 69 having a closed end provided with an attaching lug 70 which is pivotally secured to a bracket 71 on the channel member 28 by means of a pivot pin 72. The bracket 71 is secured to the channel member at a point slightly above the pivot pin 40 for the link member 38. A rod 73 is slidably mounted within the cylinder 69 and is provided with a disc 74 at its inner end, a suitable eye 75 at the other end for attachment by means of a pivot pin 76 to a lug 77 formed on or attached to the bracket 48. The rod 73 passes through a hole in a nut 78 which is screwed into the open end of the cylinder 69. A stiff spring 79 is positioned between the disc 74 and the nut 78 and acts at all times to urge the disc towards a position near the inner end of the cylinder which draws the rod 73 a substantial distance into the cylinder.

Although in the various figures of the drawings the equalizer on the right side only of the tractor is shown it will be understood that all of the parts on the right side are duplicated on the left with the same spacing and dimensions.

The loader of the invention has various functions. The chief of these is to shovel or scoop up material from a pile on the ground and deposit it in a truck standing nearby. In order to accomplish this the scoop 25 is lowered to a point near the ground as shown in dotted lines in Fig. 2 by pushing the lever 61 away from the operator and permitting the fluid in the cylinders 45 to flow back into the reservoir 57. With the scoop in this position the cylinders 45 are substantially parallel with the ground. The parts are locked in this position by moving the lever 61 into its locking position as shown in Figs. 2 and 3. The tractor is then driven towards the pile of material to be moved until the scoop strikes the material and is driven sufficiently far into it to fill the scoop with the material. It will be noted that when this takes place the shock is chiefly absorbed in the hydraulic system. However, any extraordinary force applied to the parts, as by striking a heavy rock, will tend to raise the scoop and will push back on the push rods 27 which in turn push back on the channel members 28. Movement of the channel members towards the rear about the pivot pins 30 will push down on the rear of the body frame 11 through the links 38 which will cause the frame to tilt and raise the engine. The channel members can only move back by pulling the rods 73 out of the cylinders 69 against the compression of the springs 79. Thus, additional shocks on the scoop during the scooping up process are taken up by movement of the engine itself and the springs 79.

It will be noted that because of the rigid unitary construction of the pusher rods 27 and the rigid connection between the channel members 28, the whole scoop and associated mechanism will move as a unit, even though one end of the scoop strikes a solid obstruction, such as a rock, which might normally cause the mechanism to distort.

When the scoop is properly filled with material, the lever is thrown towards the operator and the scoop rises by the action of the cylinders 45 and pistons 46, as fluid is forced into the lower end of the cylinders. When the scoop reaches the proper height, the lever is moved into the hold position which locks the fluid in the cylinders and prevents the scoop from lowering. Then the tractor is moved until the scoop is over the truck or other place where it is desired to deposit the material and the scoop is caused to dump by suitable mechanism which has not been disclosed since it is not a part of the present invention.

The above outlined process may then be repeated until all the material has been moved.

An important feature of the invention is the action of the equalizers and associated parts in steadying the scoop when the tractor is being moved with the scoop filled. This steadying or equalizing action is illustrated in Figs. 2 to 6. Assume that the scoop is filled with material and that the tractor is moving along from one place to another. The scoop may be held at the level illustrated in Fig 2. In this position the rods 73 of the equalizers are in the position shown in Fig. 6 since the weight of the scoop tends to swing it forward about the pivot pins 47 and therefore to swing the channel members 28 forward about the pins 30.

Now suppose that the right hand tread of the tractor rides up on a rock 80, as shown in Fig. 3. This will move the forward end of the carriage 15 up and therefore will raise the bracket 48 and its associated parts. Raising the bracket 48 will push up on the equalizer 68 on the right side of the tractor which, when completely closed, will push backward on the channel member 28 on the same side of the tractor. Pushing back the channel member 28 pushes down on the rear end of the body of the tractor through the link 38 on the right side, and, since the channel members are fastened together as one unit, the one on the left side moves back also. The channel members and pusher rods then assume the position shown in Figs. 3 and 4 and the engine rises.

During this operation the tread carriage on the left side of the tractor is still on level ground, and since the pusher rod on that side has moved up, the piston 46 on that side has been pulled a corresponding distance out of the associated cylinder 45, as indicated in the dotted lines of Fig. 4. But the piston 46 on the right side has been pushed into the cylinder associated therewith, since the bracket 48 has been raised by the upward movement of the carriage 15. Now since the flexible hose connections to the cylinders are connected together through the T connections 64 and 64a, fluid is free to move from the cylinder 45 on the right side to that on the left side below the pistons and in the opposite direction above the pistons, while, at the same time, maintaining a constant force on each piston. Thus the forces applied to the scoop by the two hydraulic cylinders are maintained equal in spite of the movement of one tread carriage with respect to the other.

In like manner if the carriage 15 goes down into a depression the bracket 48 drops, pulling the rod 73 further out of the cylinder 69 on the right side of the tractor and pulling the channel member 28 on that side forward. This lowers both push rods 27 which pushes the piston 46 on the left side farther into its associated cylinder and pulls the piston 46 on the right side farther out of its associated cylinder. Thus the forces holding the scoop up are again equalized, even though the tread carriages have moved relatively to each other.

In some instances I may desire to lock the two parts of the equalizers together so as to prevent relative movement between the channel members 28 and the brackets 48. For this purpose I provide a pair of aligned holes 81 in the cylinder 69 and a hole 82 in the rod 73 so that a pin 83 (Fig. 6), may be inserted through the three holes which will lock the parts together.

The loader of the invention is simple in construction and easy to operate. The shock of driving the scoop into a pile of material to be moved is largely taken up by the hydraulic system. The whole construction is steadied and held on an even keel especially while moving over uneven ground while carrying a load.

Although a caterpillar tractor is shown in the drawings, it will be understood that the invention is equally adapted for use with a tractor of the wheel type.

It will also be understood that the term "loader" as used in the specification and claims includes devices of the bulldozer type and other truck and tractor attachments with which the invention may be used.

Various modifications may be made in the structure shown and described without departing from the spirit of the invention, and I do not, therefore, wish to be limited to this specific structure except by the appended claims.

Having described my invention, what I claim as new and desire to secure by Letters Patent is:

1. A loader comprising a tractor, a pair of upright supports, one on each side of said tractor pivotally attached thereto, a pair of pusher rods, one on each side of said tractor, pivotally attached to the upper ends of said supports at points spaced from the points of attachment of said supports, extensible supports for the other ends of said pusher rods, attached to said ends of said pusher rods and pivotally connected to said tractor at points spaced forwardly of the points of connection of said upright supports, means attached to the last mentioned ends of said pusher rods for supporting a load, means connecting the rear end of said tractor with said upright supports at points above their points of attachment to said tractor, and means for controlling the extensibility of said extensible supports.

2. A loader, as defined in claim 1, comprising equalizer means connected between said upright supports and said tractor, said means being pivotally connected to said upright supports at points above the points of pivotal attachment to said tractor and being pivotally connected to said tractor at points forward of said last mentioned points of pivotal attachment.

3. A loader, as defined in claim 1, comprising resilient equalizer means connected between said upright supports and said tractor, said means being pivotally connected to said upright supports at points above the points of pivotal attachment to said tractor and being pivotally connected to said tractor at points forward of said last mentioned points of pivotal attachment.

4. A loader, as defined in claim 2, in which means are provided whereby said equalizer means may be locked to prevent movement between said upright supports and said tractor.

5. A loader, as defined in claim 1, in which the extensible supports are hydraulic cylinders and cooperating pistons, and the means for controlling the extensibility thereof comprises a source of fluid under pressure, pipes for connecting said source to said cylinders, and a control valve for controlling the fluid into and out of said cylinders.

6. A loader, as defined in claim 1, in which means is provided for rigidly connecting the pusher rods so that they will move together as a unit, and means is provided for rigidly connecting the upright supports so that they will move together as a unit.

7. A loader comprising a tractor having a body portion and caterpillar treads supported on tread carriages at each side of said portion, said carriages having limited movement with respect to said body portion in planes substantially perpendicular to the ground, a pair of upright supports, one on each side of said tractor, pivotally attached to said carriages, a pair of pusher rods, one on each side of said tractor, pivotally attached to the upper ends of said supports at points spaced from the points of attachment to said carriages, extensible supports for the other ends of said pusher rods, connected to said ends of said pusher rods and pivotally connected to said carriages at points spaced forwardly of the points of connection of said upright supports, means attached to the last mentioned ends of said pusher rods for supporting a load, means connecting the rear end of said body portion with said upright supports at points above their points of attachment to said carriages, equalizer means on each side of said tractor connecting the forward ends of said carriages with said upright supports at points above the points of attachment to said carriages, and means for controlling the extensibility of said extensible supports, said means permitting relative extensible movement of said supports.

8. A loader comprising a tractor having a body portion and caterpillar treads supported on tread carriages at each side of said portion, said carriages having limited movement with respect to said body portion in planes substantially perpendicular to the ground, a pair of upright supports, one on each side of said tractor, pivotally attached to said carriages, a pair of pusher rods, one on each side of said tractor, pivotally attached to the upper ends of said supports at points spaced from the points of attachment to said carriages, extensible supports for the other ends of said pusher rods, pivotally connected to said ends of said pusher rods and pivotally connected to said carriages at points spaced forwardly of the points of connection of said upright supports, means attached to the last mentioned ends of said pusher rods for supporting a load, means connecting the rear end of said body portion with said upright supports at points above their points of attachment to said carriages, equalizer means on each side of said tractor connecting the forward ends of said carriages with said upright supports at points above the points of attachment to said carriages, and means for controlling the extensibility of said extensible supports, said means permitting relative extensible movement of said supports.

9. A loader comprising a tractor having a body portion and caterpillar treads supported on tread carriages at each side of said portion, said carriages having limited movement with respect to said body portion in planes substantially perpendicular to the ground, a pair of upright supports, one on each side of said tractor, pivotally attached to said carriages, a pair of pusher rods, one on each side of said tractor, pivotally attached to the upper ends of said supports at points spaced from the points of attachment to said carriages, extensible supports for the other ends of said pusher rods connected to said ends of said pusher rods and pivotally connected to said carriages at points spaced forwardly of the points of connection of said upright supports, means attached to the last mentioned ends of said pusher rods for supporting a load, means connecting the rear end of said body portion with said upright supports at points above their points of attachment to said carriages, resilient equalizer means on each side of said tractor connecting the forward ends of said carriages with said upright supports at points above the points of attachment to said carriages, and means for controlling the extensibility of said extensible supports, said means permitting relative extensible movement of said supports.

10. A loader, as defined in claim 7, in which the extensible supports comprise hydraulic cylinders and cooperating pistons.

11. A loader, as defined in claim 9, in which the resilient equalizer means on each side comprises a pair of members, one pivotally connected to the forward part of the carriage and the other pivotally connected to the upright support, and a spring arranged to resist movement of said members away from each other.

12. A loader, as defined in claim 7, in which the extensible supports comprise hydraulic cylinders and cooperating pistons and the cylinders are connected in parallel to a controlled source of fluid under pressure.

13. A loader, as defined in claim 9, in which the resilient equalizer means on each side of the tractor is connected to the associated carriage adjacent the point of attachment of the extensible support and to the upright support at a point above the means connecting the rear end of the body therewith.

14. A loader, as defined in claim 13, in which the members of each of the resilient equalizer means are respectively a cylinder and a rod movable within said cylinder and a compression spring arranged within said cylinder to urge said rod into said cylinder.

JOHN PILCH.

REFERENCES CITED

The following references are of record in the file of this patent:

UNITED STATES PATENTS

| Number | Name | Date |
|---|---|---|
| 2,173,068 | Schroeder | Sept. 12, 1939 |
| 2,295,917 | Schwan | Sept. 15, 1942 |
| 2,323,434 | Williams | July 6, 1943 |
| 2,336,965 | Shoemaker | Dec. 14, 1943 |
| 2,377,495 | Hofmeister | June 5, 1945 |
| 2,395,622 | Galbreath | Feb. 26, 1946 |
| 2,436,723 | Machin | Feb. 24, 1948 |